United States Patent
Yamamoto et al.

(10) Patent No.: US 7,253,243 B2
(45) Date of Patent: Aug. 7, 2007

(54) ORGANOSILICON COMPOUNDS AND METHOD OF MANUFACTURING THE SAME

(75) Inventors: Yoshinori Yamamoto, Sendai (JP); Naoki Asao, Sendai (JP); Hisamitsu Tomeba, Sendai (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 0 days.

(21) Appl. No.: 11/505,964

(22) Filed: Aug. 18, 2006

(65) Prior Publication Data

US 2006/0281890 A1    Dec. 14, 2006

Related U.S. Application Data

(63) Continuation of application No. PCT/JP2005/002635, filed on Feb. 18, 2005.

(30) Foreign Application Priority Data

Feb. 20, 2004 (JP) ............................. 2004-044482

(51) Int. Cl.
C08G 77/06 (2006.01)
C07F 7/04 (2006.01)
C07F 7/08 (2006.01)
C07F 7/00 (2006.01)

(52) U.S. Cl. ................. 528/17; 556/430; 556/465; 556/466; 556/468

(58) Field of Classification Search ............ None
See application file for complete search history.

(56) References Cited

U.S. PATENT DOCUMENTS

| | | | |
|---|---|---|---|
| 5,113,002 A | 5/1992 | Hamada et al. | |
| 2003/0220498 A1 | 11/2003 | Furstner et al. | |

FOREIGN PATENT DOCUMENTS

| | | |
|---|---|---|
| JP | 3-263433 | 11/1991 |
| JP | 4-306235 | 10/1992 |
| JP | 4-318821 | 11/1992 |
| JP | 4-352790 | 12/1992 |
| JP | 2000-327788 | 11/2000 |
| JP | 2002-206027 | 7/2002 |
| JP | 2002-249583 | 9/2002 |
| JP | 2005-232099 | 9/2005 |
| WO | WO 2005/080472 | 9/2005 |

OTHER PUBLICATIONS

Asao et al, Tetrahedron Letters, 2005, vol. 46, pp. 27-30.
Kwak et al, Macromol. Rapid Commun. 2001, vol. 22, No. 15, pp. 1233-1236.
Kwak et al, Journal of Polymer Science, 2002, vol. 40, pp 535-543.
Maichrzak et al, Macromol. Rapid Commun. 2001, vol. 22, No. 3, pp. 202-205.
Yoshikawa et al, J. Am. Chem. Soc., 1997, vol. 119, pp. 6781-6786.
Asao et al, J. Org. Chem. 1996, vol. 61, pp. 4874-4875.
Asao et al, Bull. Chem. Soc. Jpn., 2000, vol. 73, pp. 1071-1087.
Ohshita et al, Organometallics, 1994, vol. 13, pp. 5002-5012.
Corriu et al, Organometallics, 1994, vol. 13, pp. 3194-3202.
Bucca et al, Polymer Preprints, 1995, vol. 36, No. 2, pp. 114-115 (Abstract only).
Kwak et al, Macromolecules, 2002, vol. 35, No. 10, pp. 4138-4142 (Abstract only).

*Primary Examiner*—Paul A. Zucker
(74) *Attorney, Agent, or Firm*—Oblon, Spivak, McClelland, Maier & Neustadt, P.C.

(57) ABSTRACT

There is provided a method of synthesizing an organosilicon compound. This method comprises polymerizing, as a starting material, allyl-(4-alkynyl-phenyl) silane represented by the following general formula (3) in a solvent selected from methylene chloride, chloroform, carbon tetrachloride and 1,2-dichloroethane and under the presence of hafnium tetrachloride to obtain an organosilicon compound represented by the following general formula (1).

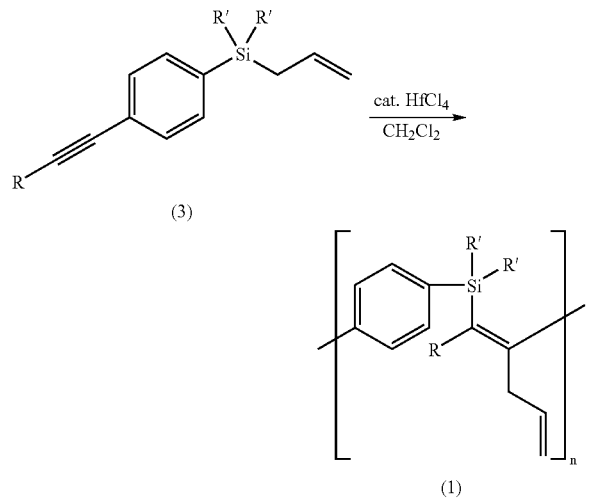

(wherein R is a hydrogen atom, an alkyl group having 1 to 6 carbon atoms or a phenyl group, R's may be the same or different and are individually an alkyl group having 1 or 2 carbon atoms or a phenyl group, and n is an integer of 4 to 2500).

14 Claims, No Drawings

ORGANOSILICON COMPOUNDS AND METHOD OF MANUFACTURING THE SAME

CROSS REFERENCE TO RELATED APPLICATIONS

This is a Continuation Application of PCT Application No. PCT/JP2005/002635, filed Feb. 18, 2005, which was published under PCT Article 21(2) in Japanese.

This application is based upon and claims the benefit of priority from prior Japanese Patent Application No. 2004-044482, filed Feb. 20, 2004, the entire contents of which are incorporated herein by reference.

BACKGROUND OF THE INVENTION

1. Field of the Invention

The present invention relates to an organosilicon compound and a method of manufacturing the organosilicon compound.

2. Description of the Related Art

σ-Π conjugated organosilicon polymers are expected to be useful as a resist material or a conductive polymer material. As for the method of synthesizing the organosilicon polymers, there are known various methods, such as the Wurts polymerization method and polymerization method using an organomagnesium compound. Either of these methods however require severe reaction conditions and the employment of a large amount of metallic reagent. Furthermore, the structure of the substrate is subject to various restrictions. Additionally, there is a problem that a large quantity of unwanted waste may be created.

BRIEF SUMMARY OF THE INVENTION

An object of the present invention is to provide an organosilicon compound such as σ-Π conjugated organosilicon polymer, and raw monomers thereof. Another object of the present invention is to provide a method of effectively synthesizing the σ-Π conjugated organosilicon polymers under less severe conditions.

The organosilicon compound according to one embodiment of the present invention is featured in that it can be represented by the following general formula (1).

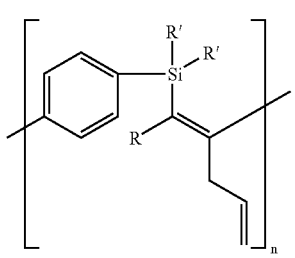

(1)

(wherein R is a hydrogen atom, alkyl group having 1 to 6 carbon atoms or a phenyl group; R's may be the same or different and are individually an alkyl group having 1 or 2 carbon atoms or a phenyl group; and n is an integer of 4 to 2500).

The organosilicon compound according to another embodiment of the present invention is featured in that it can be represented by the following general formula (3).

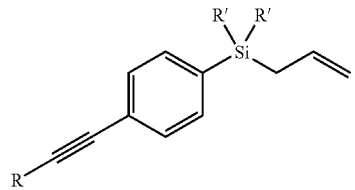

(3)

(wherein R is a hydrogen atom, alkyl group having 1 to 6 carbon atoms or a phenyl group; and R's may be the same or different and are individually an alkyl group having 1 or 2 carbon atoms or a phenyl group).

The organosilicon compound according to a further embodiment of the present invention featured in that it can be represented by the following general formula (2).

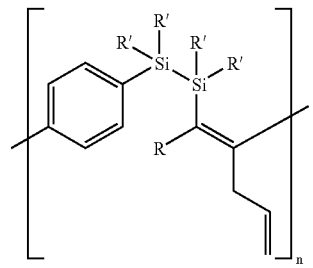

(2)

(wherein R is a hydrogen atom, alkyl group having 1 to 6 carbon atoms or a phenyl group; R's may be the same or different and are individually an alkyl group having 1 or 2 carbon atoms or a phenyl group; and n is an integer of 4 to 2500).

The organosilicon compound according to a further embodiment of the present invention featured in that it can be represented by the following general formula (4).

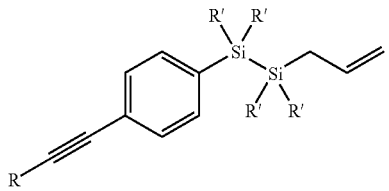

(4)

(wherein R is a hydrogen atom, alkyl group having 1 to 6 carbon atoms or a phenyl group; and R's may be the same or different and are individually an alkyl group having 1 or 2 carbon atoms or a phenyl group).

The method of synthesizing an organosilicon compound according to one embodiment of the present invention is featured in that it comprises polymerizing, as a starting material, allyl-(4-alkynyl-phenyl) silane represented by the following general formula (3) in a solvent selected from methylene chloride, chloroform, carbon tetrachloride and 1,2-dichloroethane and under the presence of hafnium tetrachloride to obtain an organosilicon compound represented by the following general formula (1).

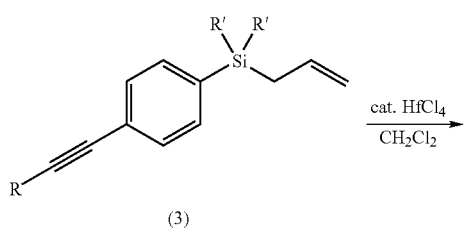

(3)

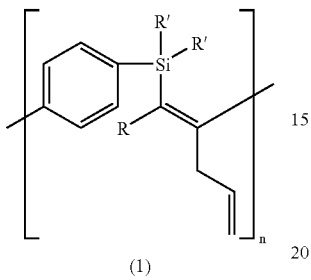

(1)

(wherein R is a hydrogen atom, alkyl group having 1 to 6 carbon atoms or a phenyl group; R's may be the same or different and are individually an alkyl group having 1 or 2 carbon atoms or a phenyl group; and n is an integer of 4 to 2500).

The method of synthesizing an organosilicon compound according to another embodiment of the present invention is featured in that it comprises polymerizing, as a starting material, 1-allyl-2-(4-alkynyl-phenyl) disilane represented by the following general formula (4) in a solvent selected from methylene chloride, chloroform, carbon tetrachloride and 1,2-dichloroethane and under the presence of hafnium tetrachloride to obtain an organosilicon compound represented by the following general formula (2).

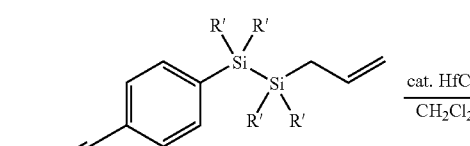

(4)

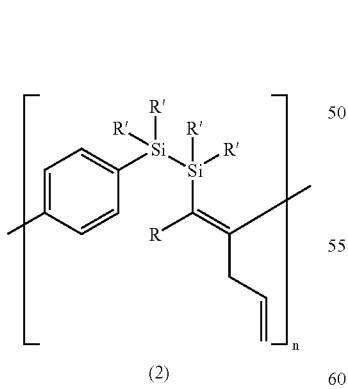

(2)

(wherein R is a hydrogen atom, alkyl group having 1 to 6 carbon atoms or a phenyl group; R's may be the same or different and are individually an alkyl group having 1 or 2 carbon atoms or a phenyl group; and n is an integer of 4 to 2500).

DETAILED DESCRIPTION OF THE INVENTION

Next, embodiments of the present invention will be explained in details.

It has been found out by the present inventors that it is possible, through the employment of a Lewis acid catalyst such as hafnium tetrachloride, to enable the carbosilylating reaction of allylsilane or vinylsilane to inactivated acetylenic linkage to effectively take place. Moreover, this reaction has very high regioselectivity as well as very high stereoselectivity, and is hence proceeds complete trans-addition as represented by the following reaction formula.

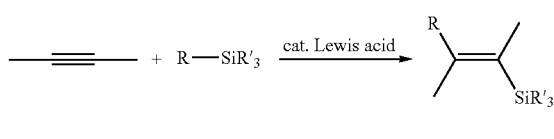

(wherein R is an allyl group or vinyl group; R' is an alkyl group having 1 or 2 carbon atoms or a phenyl group).

The present inventors have taken notice of the fact that the above-mentioned technique can be effectively applied to the synthesis of organosilicon polymers that have been considered difficult to synthesize up to date, thus accomplishing the present invention.

First of all, the polymerization reaction of organosilicon compound (4a) having an allylsilyl moiety and an acetylene linkage site was attempted using $HfCl_4$ as a Lewis acid catalyst. Preferably, the Lewis acid catalyst is employed at a ratio ranging from 0.1 to 0.5 mole or so per mole of the organosilicon compound. If the quantity of Lewis acid catalyst is too small, the reaction can be hardly taken place. On the other hand, even if the Lewis acid catalyst is employed excessively, it would be impossible to enhance any further the effects of Lewis acid catalyst. More preferably, the Lewis acid catalyst should be employed at a ratio of 0.2 mole per mole of the organosilicon compound. As a result, a polymerization reaction proceeded based on a carbosilylating reaction, as represented by the following reaction formula, thus obtaining an organosilicon polymer represented by the chemical formula (2a).

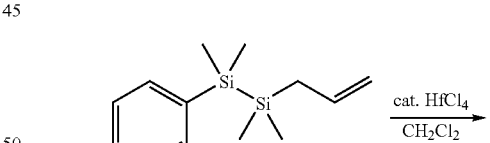

(4a)

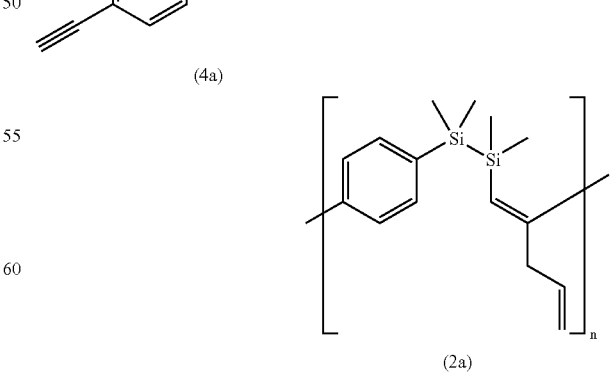

(2a)

The organosilicon polymer (2a) thus obtained was purified using isopropyl alcohol and then the molecular weight of the purified compound was analyzed by GPC (gas permeation chromatography) to obtain the following results.

Number average molecular weight (Mn): 11,971

Weight average molecular weight (Mw): 40,881

Polydispersity (PD): 3.4

Herein, a silicon compound which is a constitutional unit of the organosilicon polymer (2a) and can be represented by the following chemical formula (5) was separately synthesized.

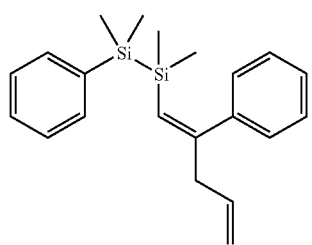

(5)

Further, UV absorption, in chloroform solvent, of the organosilicon polymer (2a) and of the silicon compound (5) was measured to obtain the following results.

Organosilicon polymer (2a): $\lambda_{max}$ 252 nm

Silicon compound (5): $\lambda_{max}$ 243 nm

It was confirmed that as compared with the silicon compound (5), the absorption maximum of the organosilicon polymer (2a) was shifted toward the long-wavelength side. This shifting of wavelength was assumed as indicating the fact that the organosilicon polymer (2a) had the characteristics of a σ-Π conjugated alternating polymer.

In the polymerization reaction in the present invention, the reaction is based on the carbosilylating reaction where a carbon-silicon linkage is utilized. Therefore, not only the construction of polymer but also the construction of a carbon-carbon linkage on the main chain occurs concurrently, thereby making it possible to introduce an allyl group which can be easily converted to various functional groups into the main chain. Moreover, since the reaction proceeds by trans-addition, the steric configuration of the olefin linkage included in the main chain can be controlled to the cis form.

Additionally, since a Lewis acid such as $HfCl_4$ is employed as a catalyst, it is possible to suppress the problem of the decomposition of a monomer brought about by the dissociation of silicon-silicon linkage, i.e. the problem which has been often caused to occur as a transition metal complex is employed as a catalyst. As described above, the method proposed by the present invention offers the features, which are required in the synthesis of organosilicon polymer, such as the ease in designing the monomer, the precision of the steric configuration of polymer, and the ease in modifying the polymer as a product. Further, since this reaction proceeds by an addition reaction, it is possible to prevent the creation of an unwanted metal halide, which has been often experienced in the Wurtz type polymerization reaction for instance. A load to the environment is minimized. Therefore, the method according to the present invention can be recognized as being a process excellent in atomic efficiency and in environmental harmony.

Next, the present invention will be further explained with reference to specific examples.

SYNTHESIS EXAMPLE 1

Synthesis of Compound 3a

First of all, (4-bromo-phenylethynyl)trimethyl silane was synthesized from 1-bromo-4-iodobenzene and then converted into 1-(allyldimethylsilanyl)-4-trimethylsilanylethynyl benzene, from which the compound 3a was synthesized.

Synthesis of (4-bromo-phenylethynyl)trimethyl silane:

Under an argon atmosphere, 1.05 g (4 mmol) of triphenyl phosphine, 40 mL of triethyl amine, 762 mg (4 mmol) of copper iodide(I) and 360 mg(2 mmol) of palladium chloride (II) were added to 160 mL of THF (tetrahydrofuran) solution containing 11.32 g (40 mmol) of 1-bromo-4-iodobenzene to obtain a mixture. Further, 5.7 mL (40 mmol) of trimethylsilyl acetylene was added to the mixture and stirred for one hour at room temperature. After the resultant solution was filtered using Celite, an aqueous solution of ammonium chloride was added to the filtrate to obtain a mixed solution, which was then subjected to extraction using ether. The organic layer thus created was washed with saturated brine and dried using magnesium sulfate as a desiccating agent. After the desiccating agent was removed by filtration, the solvent was removed by a rotary evaporator to obtain a crude product, which was then purified by silica gel column chromatography (developing solvent: hexane) to obtain 10.0 g (39.3 mmol) of white powdery product of (4-bromo-phenylethynyl)trimethyl silane. The yield was 98%.

Synthesis of 1-(allyldimethylsilanyl)-4-trimethylsilanylethynyl benzene:

6.4 mL (10 mmol) of a 1.6 M hexane solution of butyl lithium was added to 60 mL of THF solution containing 2.54 g (10 mmol) of (4-bromo-phenylethynyl)trimethyl silane under an argon atmosphere at a temperature of −78° C. and the resultant mixture was stirred for 30 minutes. Then, 1.5 mL (10 mmol) of allylchlorodimethyl silane was added to the mixture and stirred for 10 minutes, after which the temperature of the mixture was gradually returned to room temperature and additionally stirred for two hours. After an aqueous solution of ammonium chloride was added to the mixture, the resultant solution was subjected to extraction using ether. The organic layer thus created was then washed with saturated brine and dried using magnesium sulfate as a desiccating agent. After the desiccating agent was removed by filtration, the solvent was removed by a rotary evaporator to obtain a crude product, which was then purified by silica gel column chromatography (developing solvent: hexane) to obtain 2.54 g (9.33 mmol) of 1-(allyldimethylsilanyl)-4-trimethylsilanylethynyl benzene. The yield was 93%.

Synthesis of allyl-(4-ethynyl-phenyl)-dimethyl silane (3a):

1.36 g (5 mmol) of 1-(allyldimethylsilanyl)-4-trimethylsilanylethynyl benzene was suspended in 5 mL of methanol and 5 mL of methanol solution containing 330 mg (5 mmol) of potassium hydroxide was added to the resultant suspension at a temperature of 0° C. and stirred for 40 minutes. Further, the resultant solution was turned acidic by adding 5 mL of 1M hydrochloric acid thereto and subjected to extraction using ether. The organic layer thus created was then washed with saturated sodium hydrogen carbonate and also with saturated brine and dried using magnesium sulfate as a desiccating agent. After the desiccating agent was removed by filtration, the solvent was removed a rotary evaporator to obtain a crude product, which was then purified by silica gel column chromatography (developing solvent: hexane) to obtain 0.90 g (4.49 mmol) of allyl-(4-ethynyl-phenyl)-dimethyl silane (3a), which was colorless and oily. The yield was 90%.

The results of analysis of the compound thus obtained are summarized below.

$^1$H NMR (300 MHz, CDCl$_3$) δ 7.47(s, 4H), 5.82-5.66(m, 1H), 4.90-4.80(m, 2H), 3.10(s, 1H), 1.75(d, J=8.05 Hz, 2H), 0.29(s, 6H).

$^{13}$C NMR (75.5 MHz, CDCl$_3$) δ 139.8, 134.14, 133.4, 131.1, 122.5, 113.6, 83.7, 77.6, 23.5, −3.5. IR (neat) 3300, 2107, 1630, 1252, 1103, 822 cm$^{-1}$.

From the results of analysis described above, the compound obtained in this synthesis example was identified as being allyl-(4-ethynyl-phenyl)-dimethyl silane represented by the following chemical formula (3a).

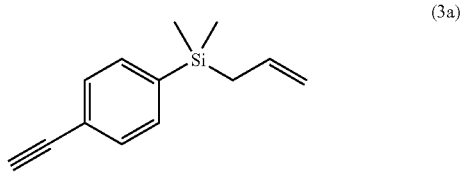

(3a)

The compound represented by the chemical formula (3a) corresponds to a compound of the aforementioned general formula (3) wherein the R is constituted by hydrogen atom, and the R' is methyl group. It is also possible, by suitably changing the starting material, to introduce an alkyl group having 1 to 6 carbon atoms or a phenyl group into the R. Further, alkyl group in this case may be replaced by a halogen atom such as fluorine, chlorine, bromine, iodine. Furthermore, the R' may be constituted by an ethyl group.

In view of appropriate reactivity, a hydrogen atom is most preferable for the R, and a methyl group is most preferable for the R'.

SYNTHESIS EXAMPLES 2

Synthesis of Compound 4a

First of all, (4-bromo-phenylethynyl)trimethyl silane was synthesized from 1-bromo-4-iodobenzene and then converted into 1-allyl-1,1,2,2-tetramethyl-2-(4-trimethylsilanylethynylphenyl) disilane, from which the compound 4a was synthesized.

Synthesis of 1-allyl-1,1,2,2-tetramethyl-2-(4-trimethylsilanylethynylphenyl) disilane:

95 mL (150 mmol) of a 1.6M hexane solution of butyl lithium was added to 600 mL of THF solution containing 38.11 g (150 mmol) of (4-bromo-phenylethynyl)trimethyl silane under an argon atmosphere at a temperature of −78° C. and the resultant mixture was stirred for 30 minutes. Then, the resultant solution was added to 300 mL of THF solution containing 28 mL (150 mmol) of 1,2-dichlorotetramethyl disilane, which was cooled down at a temperature of −78° C., and stirred for 10 minutes. The temperature of the resultant mixed solution was once returned to room temperature and then cooled down to −78° C. again. Thereafter, 150 mL (150 mmol) of 1M ether solution of allylmagnesium bromide was added to the mixed solution and the temperature of the resultant solution was then allowed to gradually return to room temperature. This resultant solution was additionally stirred for two hours, after which an aqueous solution of ammonium chloride was added to the solution and the resultant solution was subjected to extraction using ether.

The organic layer thus created was then washed with saturated brine and dried using magnesium sulfate as a desiccating agent. After the desiccating agent was removed filtration, the solvent was removed a rotary evaporator to obtain a crude product, which was then purified by silica gel column chromatography (developing solvent: hexane) to obtain 38.30 g (115.8 mmol) of 1-allyl-1,1,2,2-tetramethyl-2-(4-trimethylsilanylethynylphenyl) disilane. The yield was 77%.

Synthesis of 1-allyl-2-(4-ethynylphenyl)-1,1,2,2-tetramethyl-disilane (4a):

45 mL of methanol containing 1.98 g (30 mmol) of potassium hydroxide was added to 45 mL of methanol containing 9.92 g (30 mmol) of 1-allyl-1,1,2,2-tetramethyl-2-(4-trimethylsilanylethynylphenyl) disilane to obtain a mixture, which was stirred for 30 minutes at a temperature of 0° C. Further, the resultant solution was turned acidic by adding 30 mL of 1M hydrochloric acid thereto and subjected to extraction using ether. The organic layer thus created was then washed with saturated sodium hydrogen carbonate and also with saturated brine and dried using magnesium sulfate as a desiccating agent. After the desiccating agent was removed by filtration, the solvent was removed by a rotary evaporator to obtain a crude product, which was then purified by silica gel column chromatography (developing solvent: hexane) to obtain 5.03 g (19.44 mmol) of 1-allyl-2-(4-ethynyl-phenyl)-1,1,2,2-tetramethyl-disilane (4a) which was colorless and oily. The yield was 65%.

The results of analysis of the compound thus obtained are summarized below.

$^1$H NMR (300 MHz, CDCl$_3$) δ 7.36-7.50(m, 4H), 5.64-5.78(m, 1H), 4.81(d, J=8.03 Hz, 2H), 0.37(s, 6H), 0.05(s, 6H). $^{13}$C NMR (75.5 MHz, CDCl$_3$) δ 140.8, 134.8, 133.5, 131.1, 121.9, 112.9, 83.8, 77.5, 22.5, −3.7, −4.4. IR (neat) 3302, 2108, 1630, 1246, 1094, 800 cm$^{-1}$.

From the results of analysis described above, the compound obtained in this synthesis example was identified as being 1-allyl-2-(4-ethynyl-phenyl)-1,1,2,2-tetramethyl-disilane represented by the following chemical formula (4a).

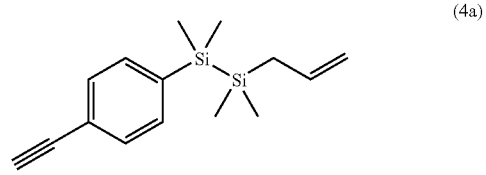

(4a)

The compound represented by the chemical formula (4a) corresponds to a compound of the aforementioned general formula (4) wherein the R is constituted by a hydrogen atom, and the R' is a methyl group. It is also possible, through the induction from the chemical formula (4a), to introduce an alkyl group having 1 to 6 carbon atoms or a phenyl group into the R. Specifically, the terminal hydrogen atom of acetylene of the chemical formula (4a) is taken away using a base and then alkyl iodide having 1 to 6 carbon atoms is added thereto to introduce an alkyl group, after which the resultant compound is allowed to undergo a coupling reaction with benzene iodide using a palladium catalyst, thus introducing a phenyl group thereto. Alternatively, it is possible, for the purpose of introducing a phenyl group thereto, to employ phenyl acetylene in place of trimethylsilyl acetylene on the occasion of executing the synthesis of (4-bromophenylethynyl) trimethyl silane. Further, an alkyl group in this case may be replaced by a halogen atom and the R' may be constituted by an ethyl group. In this case, 1,2-dichlorotetraethyl disilane can be employed.

Because of the reasons described above, a hydrogen atom is most preferable for the R and a methyl group is most preferable for the R'.

SYNTHESIS EXAMPLE 3

Synthesis of Compound 1a

Hafnium tetrachloride (64 mg, 0.2 mmol) was added to methylene chloride (2 mL) employed as a solvent under an argon atmosphere to obtain a suspension. Then, allyl-(4-ethynylphenyl)-dimethyl silane (200 mg, 1.0 mmol) obtained in the aforementioned Synthesis Example 1 was gradually added to the suspension at room temperature (25° C.) to obtain a reaction mixture. Incidentally, it is possible to employ chloroform, carbon tetrachloride or 1,2-dichloroethane in place of methylene chloride.

After being stirred for 3.5 hours, the reaction mixture was poured into isopropyl alcohol (50 mL) and further stirred for 20 minutes. The precipitate generated in this process was collected by filtration using Celite and washed with isopropyl alcohol. After the flask for receiving the filtrate was exchanged, the precipitate was washed with methylene chloride to obtain a filtrate containing the polymer dissolved therein. By using a rotary evaporator, the solvent was removed from this filtrate.

In order to completely remove the isopropyl alcohol, the product was dissolved again in methylene chloride and then the operation of removing the solvent from the resultant solution was repeated five times by the rotary evaporator. When the solvent was completely removed using a vacuum pump, a polymer bronze in color and amorphous in crystal structure was obtained. The quantity of the polymer obtained was 114 mg and the yield was 57%.

The results of analysis of the compound thus obtained are summarized below.

$^1$H NMR (300 MHz, CDCl$_3$) δ 7.70-6.70(br, 4H), 6.10-5.50(br, 2H), 5.20-4.90(br, 2H), 3.35-3.00(br, 2H), 0.14-0.20 (br, 6H). $^{13}$C NMR (75.5 MHz, CDCl$_3$) δ 158.8, 139.3, 143.8, 135.7, 133.0, 127.1, 125.7, 116.5, 46.6, −1.2. IR (KBr) 2955, 1591, 1247, 835 cm$^{-1}$.

From the results of analysis described above, the compound obtained in this synthesis example was identified as being poly[dimethyl-(1,4-pentadienyl)-phenyl silane] represented by the chemical formula (1a) shown below.

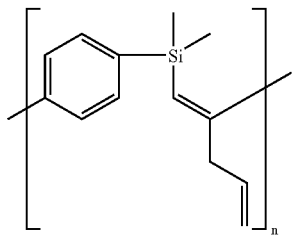

(1a)

The polymerization degree "n" was about 160. Incidentally, this polymerization degree can be controlled within the range of 4 to 2500 by suitably selecting the reaction temperature, the concentration of reagent, the reaction time, the quantity of catalyst or the poor solvent to be employed in purification. The polymerization degree "n" is generally confined to about 100 to 200, this range of values corresponding to 20000 to 40000 as this polymerization degree "n" is reduced to weight average molecular weight.

Incidentally, it has been confirmed that the polymerization reaction is enabled to take place at a wide temperature range of −30° C. to 60° C. However, if the temperature is too low, it would take as long as about 24 hours in order to obtain a desired organosilicon polymer. Therefore, the reaction temperature should preferably be 0° C. or more. It has been also confirmed that, as long as the reaction temperature is confined to the range of 0° C. to 30° C. or so, the polymerization reaction is enabled to take place by stirring the reaction mixture for 60 to 200 minutes. If the reaction is performed under a high temperature condition of 60° C. or more, it would become difficult to obtain a desired organosilicon polymer.

SYNTHESIS EXAMPLE 4

Synthesis of Compound 2a

Hafnium tetrachloride (64 mg, 0.2 mmol) was added to methylene chloride (2 mL) employed as a solvent under an argon atmosphere to obtain a suspension. Then, 1-allyl-2-(4-ethynylphenyl)-1,1,2,2-tetramethyl disilane (258.5 mg, 1 mmol) obtained in the aforementioned Synthesis Example 2 was gradually added to the suspension at room temperature (25 ° C.) to obtain a reaction mixture. It is possible to employ chloroform, carbon tetrachloride or 1,2-dichloroethane in place of methylene chloride.

After being stirred for 3.5 hours, the reaction mixture was poured into isopropyl alcohol (50 mL) and further stirred for 20 minutes. The precipitate generated in this process was collected by filtration using Celite and washed with isopropyl alcohol. After the flask for receiving the filtrate was exchanged, the precipitate was washed with methylene chloride to obtain a filtrate containing polymer dissolved therein. By using a rotary evaporator, the solvent was removed from this filtrate.

In order to completely remove the isopropyl alcohol, the product was dissolved again in methylene chloride and then the operation of removing the solvent from the resultant solution was repeated five times by the rotary evaporator. When the solvent was completely removed using a vacuum pump, a polymer bronze in color and amorphous in crystal structure was obtained. The quantity of the polymer obtained was 121.6 mg and the yield was 47%.

The results of analysis of the compound thus obtained are summarized below.

$^1$H NMR (300 MHz, CDCl$_3$) δ 7.55-7.16(br, 2H), 7.16-6.78(br, 2H), 5.93-5.65(br, 1H), 5.53(br, 1H), 5.14-4.87(br, 2H), 3.28-2.99(br, 2H), 0.25(br, 6H), −0.23(br, 6H). $^{13}$C NMR (75.5 MHz, CDCl$_3$) δ 157.3,.143.8, 138.2, 136.0, 133.3, 127.3, 125.8, 116.3, 46.7, −2.6, −3.7. IR (KBr) 2951, 1589, 1244, 829 cm$^{-1}$. UV-vis(CHCl$_3$) λ$_{max}$/nm(ε) 252 nm (12000)

From the results of analysis described above, the compound obtained in this synthesis example was identified as being poly[1,1,2,2-tetramethyl-1-(1,4-pentadienyl)-2-phenyl disilane] represented by the chemical formula (2a) shown below.

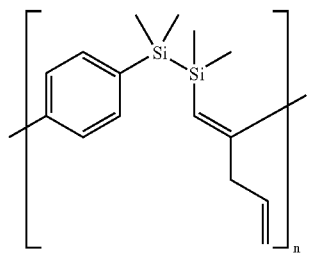

(2a)

The polymerization degree "n" was about 160. Incidentally, this polymerization degree can be controlled within the range of 4 to 2500 by suitably selecting the reaction temperature, the concentration of reagent, the reaction time, the quantity of catalyst or the poor solvent to be employed in purification. The polymerization degree "n" is generally confined to about 100 to 200, this range of values corresponding to 25000 to 50000 as this polymerization degree "n" is a reduced to weight average molecular weight.

The present invention can be suitably applied to the synthesis of σ-Π conjugated organosilicon polymers which are expected to be utilized as conductive polymer materials, etc.

What is claimed is:

1. An organosilicon compound represented by the following general formula (1)

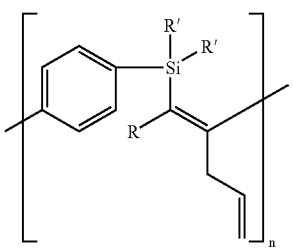

(1)

(wherein R is a hydrogen atom, an alkyl group having 1 to 6 carbon atoms or a phenyl group; R's may be the same or different and are individually an alkyl group having 1 or 2 carbon atoms or a phenyl group; and n is an integer of 4 to 2500).

2. An organosilicon compound represented by the following general formula (3)

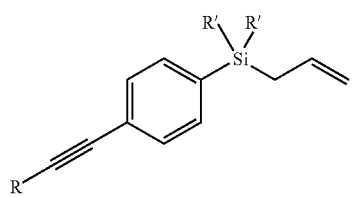

(3)

(wherein R is a hydrogen atom, an alkyl group having 1 to 6 carbon atoms or a phenyl group; and R's may be the same or different and are individually an alkyl group having 1 or 2 carbon atoms or a phenyl group).

3. The organosilicon compound according to claim 1, wherein, in the general formula (1), R is a hydrogen atom, and R's are methyl group.

4. An organosilicon compound represented by the following general formula (2)

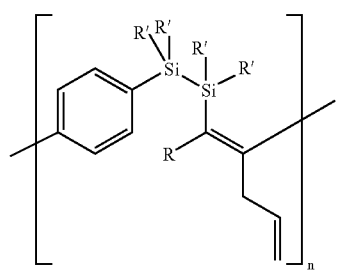

(2)

(wherein R is a hydrogen atom, an alkyl group having 1 to 6 carbon atoms or a phenyl group; R's may be the same or different and are individually an alkyl group having 1 or 2 carbon atoms or a phenyl group; and n is an integer of 4 to 2500).

5. An organosilicon compound represented by the following general formula (4)

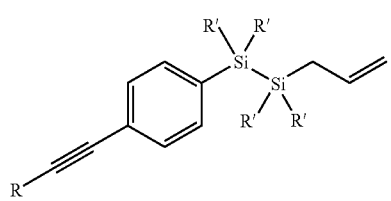

(4)

(wherein R is a hydrogen atom, an alkyl group having 1 to 6 carbon atoms or a phenyl group; and R's may be the same or different and are individually an alkyl group having 1 or 2 carbon atoms or a phenyl group).

6. The organosilicon compound according to claim 4, wherein, in the general formula (2), R is a hydrogen atom, and R's are a methyl group.

7. A method of synthesizing an organosilicon compound comprising polymerizing, as a starting material, allyl-(4-alkynyl-phenyl) silane represented by the following general formula (3) in a solvent selected from methylene chloride, chloroform, carbon tetrachloride and 1,2-dichloroethane and under the presence of hafnium tetrachloride to obtain an organosilicon compound represented by the following general formula (1)

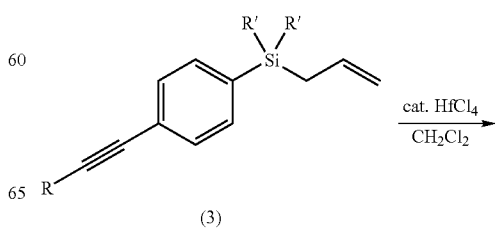

(3)

-continued

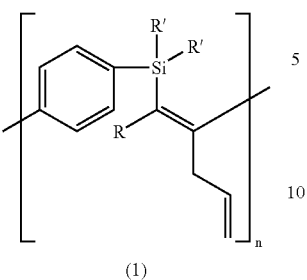

(1)

(wherein R is a hydrogen atom, an alkyl group having 1 to 6 carbon atoms or a phenyl group; R's may be the same or different and are individually an alkyl group having 1 or 2 carbon atoms or a phenyl group; and n is an integer of 4 to 2500).

8. A method of synthesizing an organosilicon compound comprising polymerizing, as a starting material, 1-allyl-2-(4-alkynyl-phenyl) disilane represented by the following general formula (4) in a solvent selected from methylene chloride, chloroform, carbon tetrachloride and 1,2-dichloroethane and under the presence of hafnium tetrachloride to obtain an organosilicon compound represented by the following general formula (2)

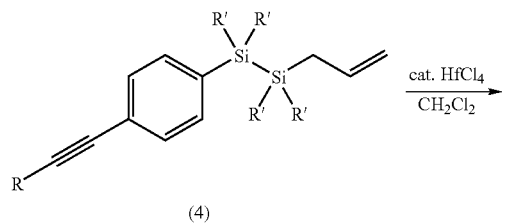

(4)

-continued

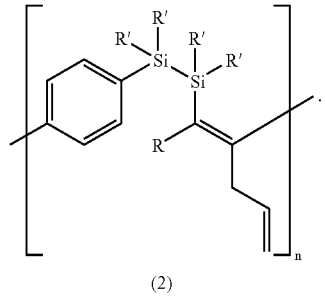

(2)

(wherein R is a hydrogen atom, an alkyl group having 1 to 6 carbon atoms or a phenyl group; R's may be the same or different and are individually an alkyl group having 1 or 2 carbon atoms or a phenyl group; and n is an integer of 4 to 2500).

9. The method of synthesizing an organosilicon compound according to claim 7, wherein the polymerization is performed with stirring for 1 to 24 hours at a temperature ranging from −30° C. to 60° C.

10. The method of synthesizing an organosilicon compound according to claim 7, wherein the hafnium tetrachloride is employed at a ratio of 0.1 to 0.5 mole per mole of the starting material.

11. The organosilicon compound according to claim 2, wherein, in the general formula (3), R is a hydrogen atom, and the R's are methyls group.

12. The organosilicon compound according to claim 5, wherein, in the general formula (4), R is a hydrogen atom, and the R's are a methyls group.

13. The method of synthesizing an organosilicon compound according to claim 8, wherein the polymerization is performed with stirring for 1 to 24 hours at a temperature ranging from −30° C. to 60° C.

14. The method of synthesizing an organosilicon compound according to claim 8, wherein the hafnium tetrachloride is employed at a ratio of 0.1 to 0.5 mole per mole of the starting material.

* * * * *